United States Patent [19]

Ragab

[11] Patent Number: 5,322,248
[45] Date of Patent: Jun. 21, 1994

[54] METHODS AND ARRANGEMENTS TAILORING AERODYNAMIC FORCES AFFORDED BY A PAYLOAD TO REDUCE FLIGHT LOADS AND TO ASSIST FLIGHT CONTROL FOR THE COUPLED SYSTEM

[75] Inventor: Mohamed M. Ragab, San Diego, Calif.

[73] Assignee: General Dynamics Corporation Space Systems Division, San Diego, Calif.

[21] Appl. No.: 857,876

[22] Filed: Mar. 26, 1992

[51] Int. Cl.[5] .................... B64G 1/14; F42B 10/00; F42B 15/01
[52] U.S. Cl. .................... 244/160; 244/158 R; 244/3.15; 244/55; 244/63
[58] Field of Search .............. 244/158, 160, 162, 36, 244/63, 55, 56, 3.15, 3.23, 3.24

[56] References Cited

U.S. PATENT DOCUMENTS

| | | | |
|---|---|---|---|
| 3,065,937 | 11/1962 | Vigil | 244/160 |
| 3,204,892 | 9/1965 | Powell | 244/218 |
| 3,290,681 | 12/1966 | Beteille | 244/158 R |
| 3,702,688 | 11/1972 | Faget | 244/162 |
| 4,557,444 | 12/1985 | Jackson et al. | 244/158 R |
| 4,844,380 | 7/1989 | Peoples et al. | 244/63 |
| 4,884,770 | 12/1989 | Martin | 244/160 |
| 5,139,216 | 8/1992 | Larkin | 244/3.23 |
| 5,141,181 | 8/1992 | Leonard | 244/158 R |
| 5,143,327 | 9/1992 | Martin | 244/160 |
| 5,143,328 | 9/1992 | Leonard | 244/158 R |
| 5,172,875 | 12/1992 | Fried | 244/158 R |
| 5,186,419 | 2/1993 | Scott | 244/158 |

OTHER PUBLICATIONS

Aviation Week and Space Technology "Europeans looking Beyond Ariane 4 to Goal of Independence in Space" pp. 77-89 Jun. 9, 1986.

Primary Examiner—Michael S. Huppert
Assistant Examiner—Virna Lissi Ansley
Attorney, Agent, or Firm—John R. Duncan; Frank D. Gilliam

[57] ABSTRACT

An arrangement for controlling the flight of a launch vehicle and a coupled payload, such a spaceplane, from launch to the separation of the payload from the vehicle. The launch vehicle is provided with controllable gimballed rocket engines and optionally with aerodynamic control surfaces, that are controlled by flight control systems. The payload having controlled flight surfaces has control systems that cooperate with those flight control systems carried by the launch vehicle to jointly control the coupled launch vehicle and coupled payload during coupled flight. The cooperating flight control systems provide open and closed loop control systems that react to winds measured prior to launch and atmospheric disturbances as indicated by on-board sensors during flight. The payload is mounted on the launch vehicle at a cant angle relative to the longitudinal axis of the launch vehicle to optimize its lift to the coupled launch vehicle and payload. Roll steering is also used to minimize the exposure of the vehicle's most critical plane to atmosphere disturbances and/or to maximize available control authority, in addition to pitch and yaw steering.

10 Claims, 2 Drawing Sheets

METHODS AND ARRANGEMENTS TAILORING AERODYNAMIC FORCES AFFORDED BY A PAYLOAD TO REDUCE FLIGHT LOADS AND TO ASSIST FLIGHT CONTROL FOR THE COUPLED SYSTEM

BACKGROUND OF THE INVENTION

1. Field of the Invention

The present invention relates to an improvement in the imposition of flight loads on and the control of launch vehicles, and more particularly, but not by way of limitation, to an arrangement which uses the positioning of a payload and flight control means that it carries to assist in the control of the associated launch vehicle as it carries the payload aloft.

2. Description of the Prior Art

At present the flight vehicle that is used to carry a payload from the surface of the earth to a desired altitude is commonly a launch vehicle that is powered by a plurality of rocket engines. The thrust of the launch vehicle may also be aided by separable rocket boosters which are detachable from the launch vehicle when expended. Launch vehicles are typically controlled during atmospheric ascent by controlled gimballing of their rocket engines or other means of thrust vectoring. In some instances where additional control authority of the launch vehicle is required, fins and other control surfaces on the aft end of the launch vehicle are used.

With the advent of non-encapsulated spaceplane payloads with a lifting body or winged design, the airloads created at the front end during atmospheric flight will be significantly higher than for a traditional payload that is encapsulated in a fairing designed to generate minimum airloads. Such a configuration causes the bending moments along the vehicle and the required rocket engine gimbal angles to be excessive when conventional control is used. Instead of carrying those loads and the resulting weight, performance and cost penalties, it is believed that the present invention will reduce those loads to a minimum and permit achievement of the optimal design for the coupled launch vehicle and coupled spaceplane.

SUMMARY OF THE INVENTION

In accordance with one aspect of the invention, an arrangement and method for controlling the flight of a launch vehicle and an associated payload as the launch vehicle carries the payload aloft to the point of separation of the payload from the flight vehicle is provided. A launch vehicle provided with gimballed rocket engines and adapted to carry a payload from the surface of the earth to a predetermined altitude is also provided with flight control systems to control the flight of the launch vehicle through the atmosphere. A payload, such as a spaceplane provided with aerodynamic control surfaces, is carried by the launch vehicle at its front end and is provided with flight control systems which cooperate with those flight control systems carried by the launch vehicle to jointly control the flight of the coupled payload and launch vehicle through the atmosphere until separation. The cooperating flight control systems provide open and closed loop control systems that react to winds and atmospheric conditions measured along the anticipated flight path of the launch vehicle prior to launch and atmospheric disturbances as indicated by on board sensors during flight.

Another aspect of the present invention contemplates positioning of the spaceplane at the front end of the launch vehicle at a cant angle relative to the longitudinal axis of the launch vehicle. Thus, the loads imposed on the launch vehicle and the maximum control system deflections are minimized. The cant angle of the spaceplane is in the pitch plane and is a major parameter that can be used to advantage. Airload distributions vary with flight conditions and the present invention contemplates taking all flight events into account to minimize flight loads by ensuring that loads at particular locations, are at a minimum and to minimize all aerodynamic forces about the coupled launch vehicle and payload center of gravity. The spaceplane/launch vehicle fuel management system can be used to redistribute the propellant mass so that the contribution of inertia loads to total vehicle loads is optimized in different flight configurations.

Another aspect of the invention contemplates that roll steering be used to minimize the exposure of the coupled payload and launch vehicle critical plane to atmosphere disturbances or wind shears, and/or maximize the available control authority, in addition to pitch and yaw steering.

Still another aspect of the invention contemplates that similar flight vehicles, such as missiles or launch vehicles that carry a payload at its front end with an aerodynamic fairing would be configured to generate aerodynamic forces, and therefore can also favorably incorporate the features of the invention described above.

Further advantages of the invention will be evident from the detailed description, when read in conjunction with the accompanying drawings which illustrate the invention.

DETAILED DESCRIPTION OF THE DRAWINGS

Figure 1:
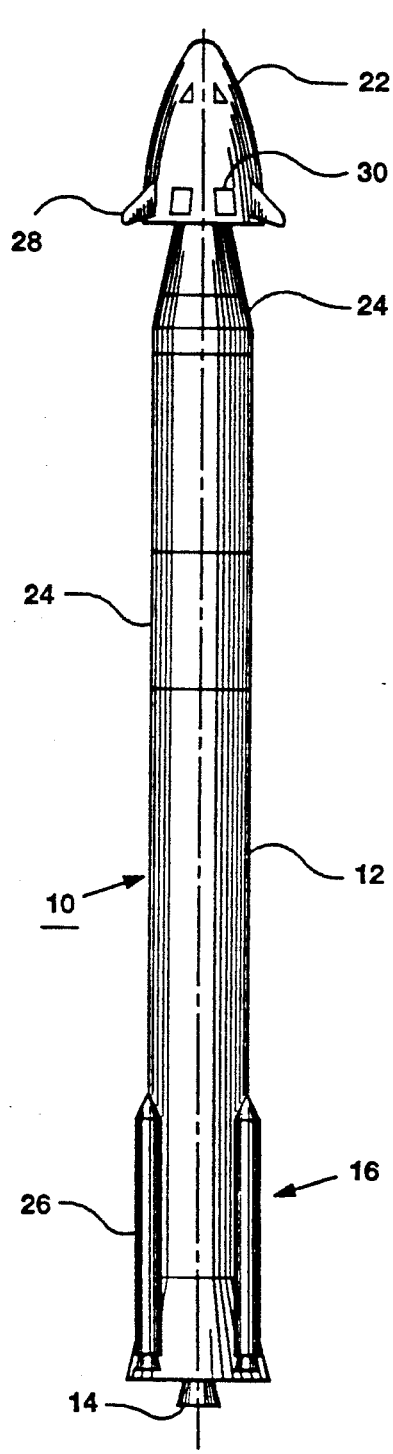
FIG. 1 is a plan view of a payload and coupled launch vehicle constructed in accordance with a preferred embodiment of the invention.
Figure 2:
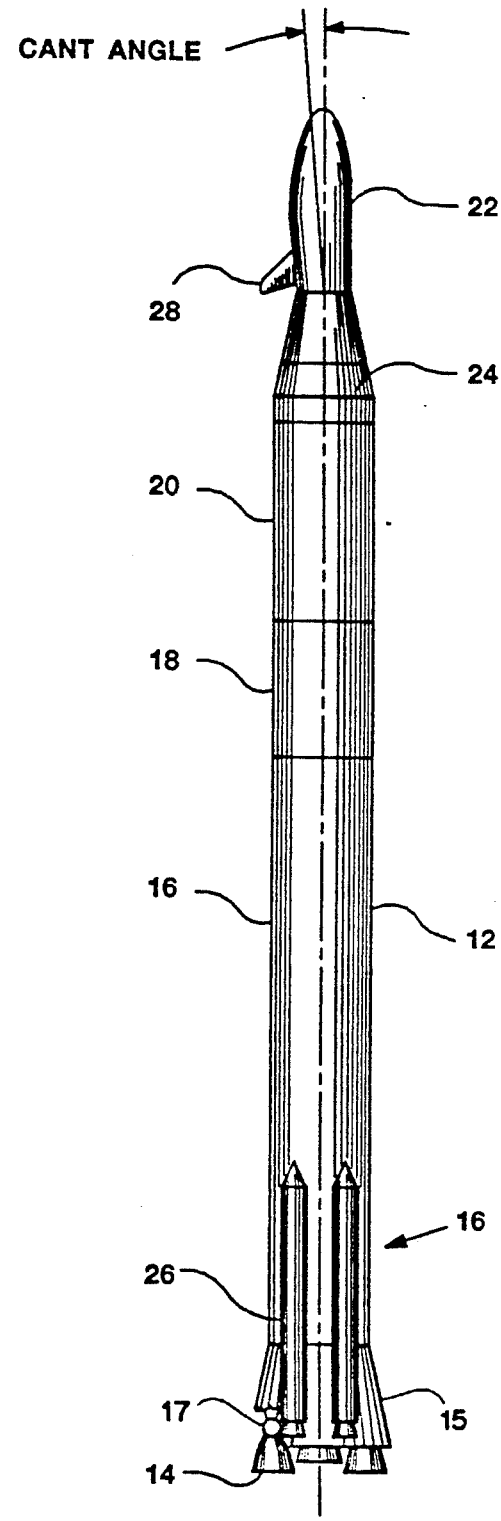
FIG. 2 is a side view of the payload and launch vehicle of FIG. 1 and illustrates the cant angle of the positioning of the payload on the launch vehicle.

Referring now to the drawings in detail, and in particular to FIGS. 1 and 2, reference character 10 generally refers to an arrangement constructed in accordance with a preferred embodiment of the present invention. The arrangement 10 includes a suitable launch vehicle 12 that is provided with a plurality of rocket engines 14 surrounded by skirt 15 at its aft end. As is known in the art, the engines are controllably gimballed by a conventional, generally spherical, gimbal 17 to the launch vehicle 12 for controlling the flight of the launch vehicle 12 after it has been launched from the surface of the earth into the atmosphere. The launch vehicle/payload system 10 illustrated is exemplary and comprises aft first stage propellant tanks 16 for rocket engines 14, intermediate stage adaptor 18 and upper stage sections 20. The launch vehicle 12 also contains certain flight control systems that will be described more fully hereinafter.

A payload 22 is separably connected to the vehicle 12 by a suitable adaptor 24. The launch vehicle 12 is provided with gimballed liquid fuel rocket engines 14 for propulsion but the vehicle 12 may also be provided with a plurality of liquid or solid rocket boosters 26 that are separably secured to the aft section 16 of the launch vehicle 12 for additional boost when needed because of such factors as the weight of the payload or the height to which the launch vehicle is to carry the payload 22 before determined separation. If needed, it is also known to provide the launch vehicle 12 with additional control surfaces and fins on the aft section 16 of the vehicle 12 if additional control authority of the launch vehicle is desired.

The present invention recognizes that the positioning of a non-encapsulated spaceplane on the forward end of a launch vehicle creates significantly greater airloads and causes the bending moments along the length of the launch vehicle and required rocket engine gimbal angles to be excessive when conventional control of the vehicle is utilized. Instead of carrying those loads and the resulting weight, performance and cost penalties, the arrangement 10 reduces those loads to a minimum and achieves an optimum design for the coupled launch vehicle 12 and spaceplane 22.

The spaceplane 22 which can be adapted to carry human passengers is mounted on the launch vehicle 12, as seen most clearly in FIG. 2, at a predetermined cant angle relative to the longitudinal axis of the launch vehicle 12. The spaceplane 22 generates lift primarily in its pitch plane depending on its cant angle in pitch which is a major parameter that can be used to minimize bending loads and/or maximum control system deflections.

The spaceplane 22 is also provided with suitable control surfaces such as elevons 28 and flaps 30. Other aerodynamic control surfaces or thrusters customarily used in the control of flight vehicles could also be employed so that the flight surfaces illustrated should be considered to be exemplary only and not limiting.

Figure 3:
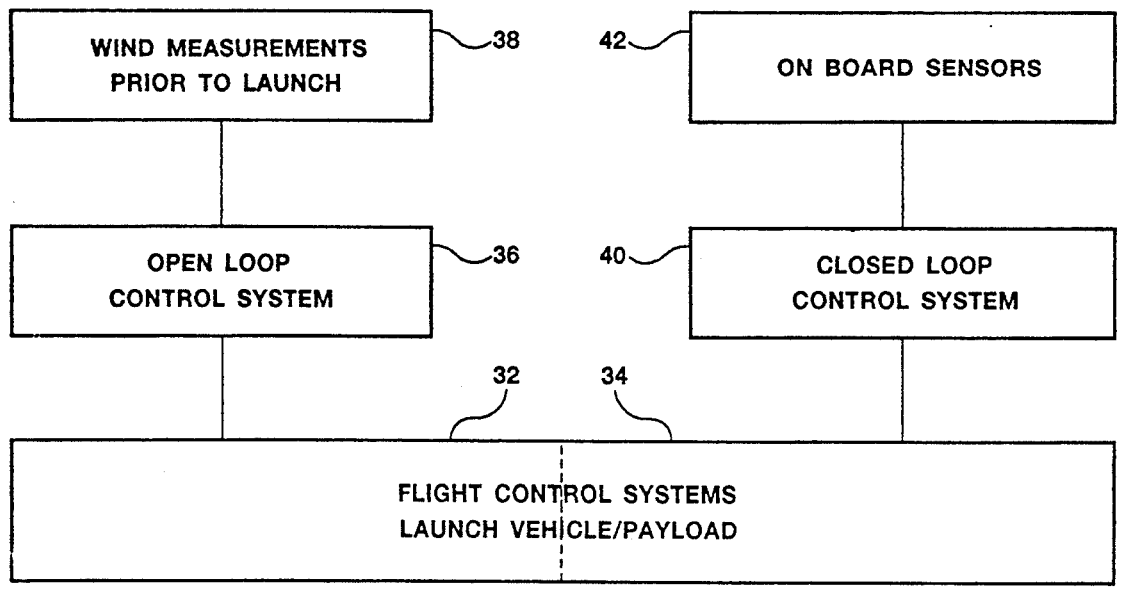
FIG. 3 is a simplified block diagram that illustrates the aerodynamic flight control system for the arrangement of FIGS. 1 and 2.

Referring now to FIG. 3, a simplified block diagram is seen that relates to the flight control systems of the present invention. The flight control systems 32 for the launch vehicle 12 include those systems which control the gimballing of the rocket engines as required to control the flight of the launch vehicle after launch. These systems 32 directly cooperate with those flight control systems 34 of the spaceplane 22 to provide an integrated overall control system scheme during the period the launch vehicle 12 and the spaceplane 22 are coupled during flight and prior to separation. The flight control systems 34 of the spaceplane 22 then operate independently to control the flight of the spaceplane 22 during the remainder of its mission following such separation.

The overall flight control regime for the coupled launch vehicle 12 and spaceplane 22 further includes an open loop control system 36 coupled to the cooperating flight control systems 32 and 34 of the launch vehicle 12 and spaceplane 22. The open loop system 36 receives inputs 38 that are winds, wind shears, and other atmospheric disturbances that have been measured along the anticipated path of flight of the coupled launch vehicle 12 and spaceplane 22 or steering coefficients that have been computed based on those measurements. Recognizing that the spaceplane generates lift primarily in its pitch plane, the open loop control system 36 will use roll steering of the coupled launch vehicle 12 and spaceplane 22 to orient the coupled crafts to minimize the exposure of that plane to the atmospheric disturbances or wind shears measured along its flight path prior to launch and/or to maximize available control authority. In addition, pitch and yaw steering by the open loop control system 36 for control of the coupled flight vehicles will be utilized.

The cooperating flight control systems 32 and spaceplane 34 of the launch vehicle 12 and 22 are coupled to a closed loop control system 40 which receives signals 42 which are representative of gusts, wing persistence effects and other atmospheric disturbances that are encountered during flight. These signals are received from on board sensors during flight.

Figure 4:
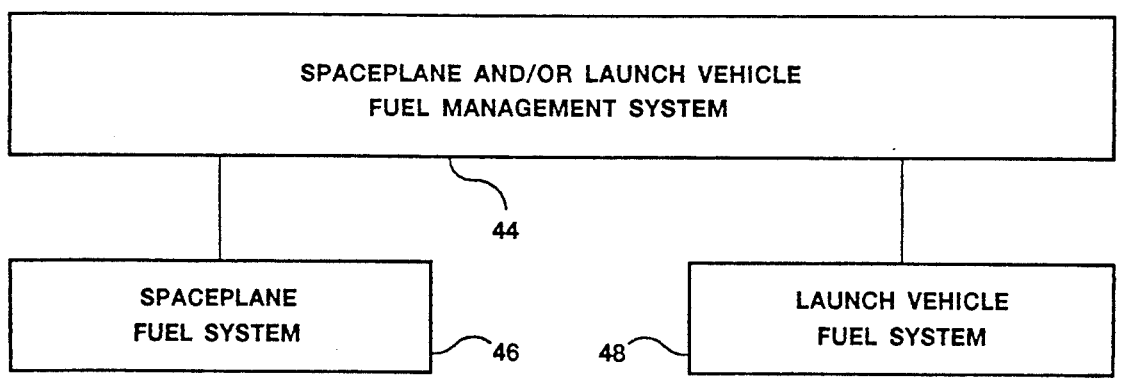
FIG. 4 is a simplified block diagram that illustrates the fuel management system for the arrangement of FIGS. 1 and 2.

In addition to the flight control regime seen in FIG. 3 another important aspect of this invention is illustrated in FIG. 4. As has been previously described, the positioning of the spaceplane 22 on the launch vehicle 12 is a major factor in minimizing the loads and maximum control system deflections during flight of the coupled flight vehicles. It should also be understood that airload distributions vary with flight conditions such as mach number, dynamic pressure, etc., and the optimization of loads will take all flight events into account and will depend on the relative importance of loads versus control system travel. Flight loads are minimized when the moment of all aerodynamic forces about the total coupled vehicle arrangement center of gravity is at a minimum or when loads at particular locations are at a minimum. The arrangement 10 for controlling the flight of the coupled launch vehicle 12 and spaceplane 22 contemplates that the spaceplane 22 and/or launch vehicle 12 would include a fuel management system 44 that would control the coupled spaceplane fuel system 46 and the coupled launch vehicle fuel system 48. Thus, the fuel management system 44 is used to redistribute the propellant mass such that the contribution of inertia loads to total vehicle loads is optimized in different flight configurations.

Changes may be made in the combination and arrangement of parts or elements as heretofore set forth in the specification and shown in the drawings, it being understood that changes may be made in the embodiments disclosed without departing from the spirit and scope of the invention as defined in the following claims. For example, similar flight vehicles, such as missiles or launch vehicles with payload fairings can be configured to generate controllable loads at the front end, and therefore can advantageously incorporate the teachings of the present invention by using special devices such as flaps, moving canards, thrusters, and the like.

I claim:

1. An arrangement for controlling the flight of a launch vehicle and an associated payload as the launch vehicle carries the payload aloft to the point of separation of the payload from the flight vehicle which comprise:

a launch vehicle provided with gimballed rocket engines and adapted to carry a payload from the surface of the earth to a predetermined altitude, which vehicle is provided with flight control systems to control the flight of the launch vehicle through the atmosphere by controlled gimballing of said rocket engines, a spaceplane payload carried by the launch vehicle and coupled to said launch vehicle at a predetermined fixed cant angle relative to the longitudinal axis of the launch vehicle, and said spaceplane payload is provided with flight control systems comprising aerodynamic flight control surfaces operable during said coupled flight that cooperate with the engine gimballing flight control systems carried by the launch vehicle to jointly control the flight of the coupled payload and launch vehicle through the atmosphere until separation.

2. The arrangement of claim 1 wherein the spaceplane is configured with wing surfaces.

3. The arrangement of claim 1 wherein the spaceplane is configured to provide a body which affords a lifting force in flight.

4. The arrangement of claim 3 where the launch vehicles control systems include closed loop and open loop control systems.

5. The arrangement of claim 4 wherein the launch vehicle's closed loop system reacts to atmospheric disturbances encountered during flight as indicated by on-board sensors carried by the coupled launch vehicle/spaceplane and the open loop control system is controlled by the winds measured prior to launch of the launch vehicle.

6. The arrangement of claim 1 wherein the flight control systems of the spaceplane includes a fuel management system that optimizes the position of the propellant mass of the coupled launch vehicle and spaceplane whereby the contribution of inertia loads to total coupled launch vehicle and spaceplane loads is optimized in different flight configurations.

7. The arrangement of claim 6 wherein the flight control systems carried by the launch vehicle and the flight control systems carried by the spaceplane cooperate in response to varying flight conditions to minimize flight loads imposed by flight events and atmosphere disturbances and maximize control authority of the coupled launch vehicle and spaceplane.

8. A method for controlling flight of a coupled elongated launch vehicle and streamlined payload fairing during flight from initial launch to an altitude where said fairing is decoupled, which comprises the steps of:
providing engines on gimball mounts at the aft end of said launch vehicle;
mounting said streamlined fairing at the forward end of said launch vehicle with the longitudinal axis of said fairing at a selected fixed cant angle to the longitudinal axis of said launch vehicle;
at least partially controlling flight of said coupled launch vehicle by gimballing said engines; and
further controlling flight of said coupled launch vehicle by selectively moving aerodynamic surfaces on said fairing;
whereby loads imposed on the coupled launch vehicle and fairing are reduced and control authority is increased.

9. A method for controlling a launch vehicle for an exposed payload which has controllable gimballed rocket engines as defined in claim 8 wherein a closed loop control system reacts to control information representative of sensed atmospheric disturbances encountered during flight and the closed loop control system receives control information representative of atmospheric disturbances and wind shears measured along the anticipated flight path of the launch vehicle prior to launch.

10. A method for controlling a launch vehicle for an exposed payload which has controllable gimballed rocket engines as defined in claim 8 which further includes the step of using a fuel management system of the payload to position the center of gravity of the coupled launch vehicle and payload such that the contribution of inertial loads to total vehicle loads is minimized in different flight configurations.

* * * * *